Oct. 27, 1953    J. P. CARR    2,656,762
WHEEL MIRROR ASSEMBLY
Filed Feb. 2, 1950    3 Sheets-Sheet 1
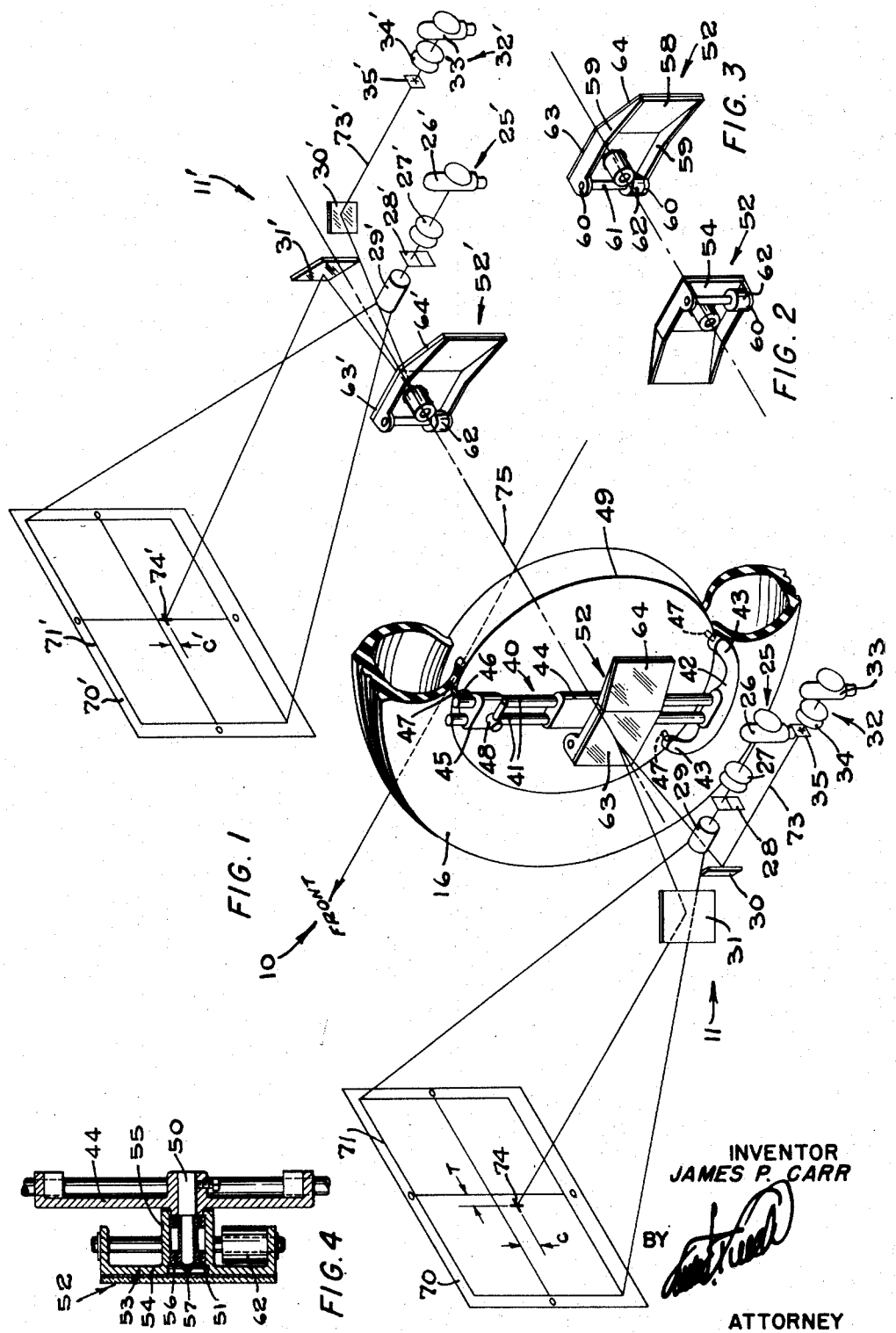
INVENTOR
JAMES P. CARR
BY
ATTORNEY Oct. 27, 1953　　　　　J. P. CARR　　　　　2,656,762
WHEEL MIRROR ASSEMBLY
Filed Feb. 2, 1950　　　　　　　　　　　　3 Sheets-Sheet 2
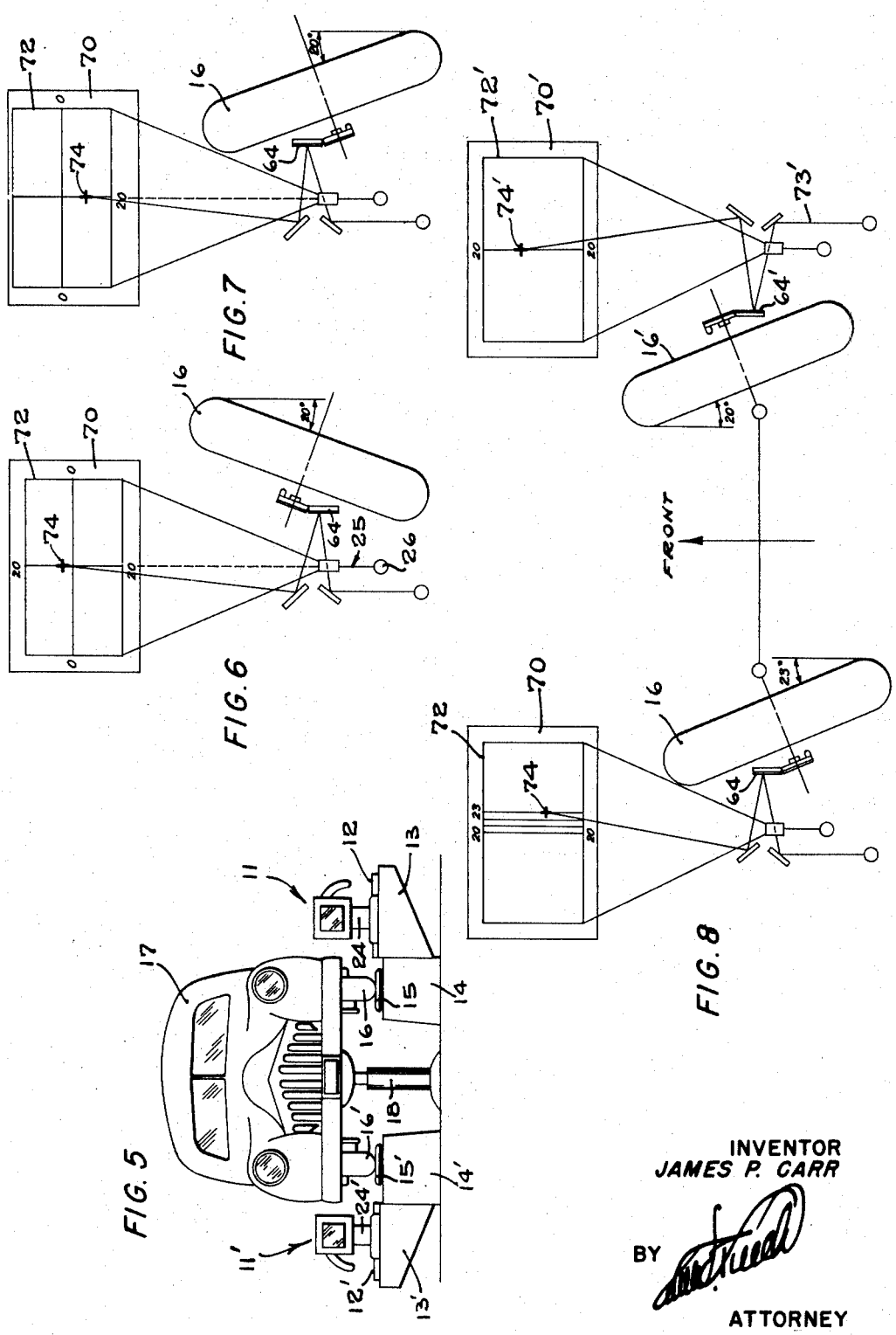
INVENTOR
JAMES P. CARR
BY
ATTORNEY

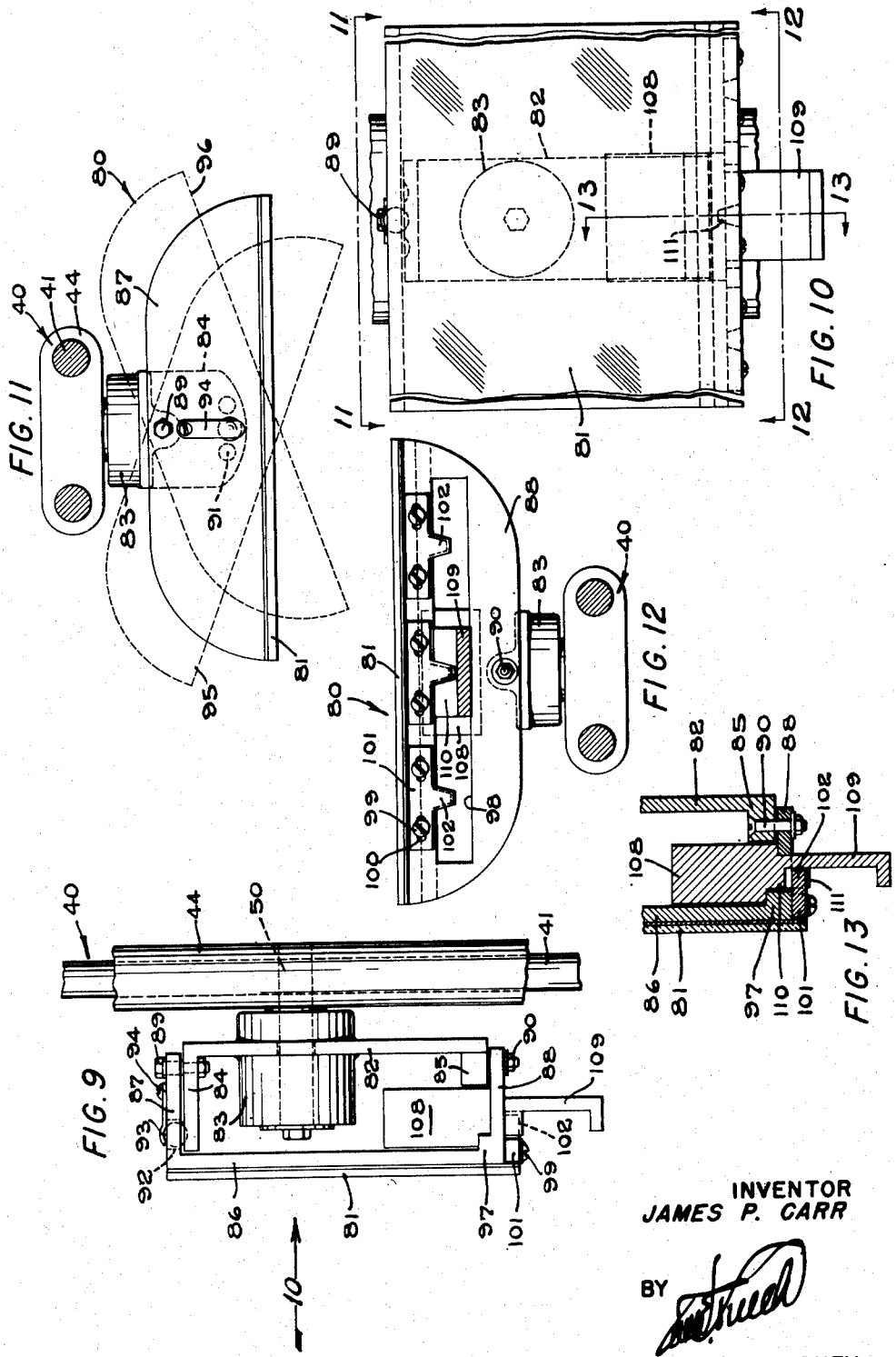

Patented Oct. 27, 1953

2,656,762

UNITED STATES PATENT OFFICE 2,656,762

WHEEL MIRROR ASSEMBLY

James P. Carr, Lansing, Mich., assignor to Food Machinery and Chemical Corporation, San Jose, Calif., a corporation of Delaware Application February 2, 1950, Serial No. 141,988

3 Claims. (Cl. 88—74)

This invention relates to that class of optical instruments employed for measuring the alignment characteristics of the dirigible front wheels of an automotive vehicle, and particularly to such instruments of the type disclosed in the co-pending application for U. S. Letters Patent Serial No. 571,717, filed January 5, 1945, now Patent No. 2,496,324, by Roland E. Wilson.

In the Wilson device, known commercially as the Visualiner, two screens are set up in front of the vehicle, a three-faced mirror assembly is mounted upon each of the front wheels facing laterally therefrom, and two optical units, one of which is disposed outwardly from each of said wheel-mirror assemblies, are mounted alongside of and close to said vehicle, but supported independently thereof. Each of said units projects (1st) a chart on the screen immediately ahead thereof and (2nd) a beam of light onto the adjacent wheel-mirror assembly, the reflection of which is deflected by a deflector on said unit to cause said deflected beam to form a cross hair image on said screen. The charts projected onto the screen are so calibrated that the locations thereon of the cross hair images, following a few simple standard manipulations of the apparatus and wheels, indicate precisely in degrees the amount of each of the alignment characteristics which it is desired to measure. These include camber, caster, toe-in, toe-out, and king-pin inclination.

Modifications of the Wilson apparatus are disclosed in the co-pending application of Tracy Carrigan, Serial No. 659,317, filed April 3, 1946, now Patent No. 2,601,262, and in U. S. Letters Patent to Carrigan et al., No. 2,470,090 issued May 17, 1949.

The present invention is adapted for use in the Wilson apparatus or any of the modifications thereof and has the object of providing a novel and inexpensive wheel-mirror assembly which accomplishes the same functions as the three-faced wheel-mirror assembly previously used in the Wilson type apparatus but which requires only two faces. As each face is formed by a glass mirror and is thus readily damaged, the wheel-mirror assembly of my invention is not only economical in first cost, but in the cost of maintenance.

It is a further object of the present invention to provide a wheel mirror assembly which accomplishes the same functions as the three-faced wheel mirror assembly in the Wilson type apparatus, but which requires only a single reflecting face, this face being shiftable to successively perform the functions of the three separate faces on the Wilson type mirror assembly.

The manner of accomplishing the aforesaid object and additional objects and advantages will be made manifest in the following description taken in connection with the accompanying drawings in which:

Fig. 1 is a diagrammatic perspective view of a preferred embodiment of the wheel-mirror assembly of the invention incorporated in an apparatus of the Wilson type and illustrating the manner in which said wheel mirror assembly is employed in measuring camber and toe-in.

Fig. 2 is a perspective view of the wheel-mirror assembly shown in Fig. 1 as turned about its axis to extend the wing mirror thereof in a forward direction.

Fig. 3 is a view similar to Fig. 2 and illustrating said wheel-mirror assembly turned about its mounting axis to extend the wing mirror thereof rearwardly. Figs. 2 and 3 also illustrate the manner in which the counterweight of said mirror assembly automatically shifts to properly balance said mirror assembly when it is rotated from the position in which it is shown in Fig. 2 to the position in which it is shown in Fig. 3 or vice versa.

Fig. 4 is a diagrammatic vertical sectional view taken through the axis of rotation of said wheel-mirror assembly and illustrating the construction of this and the manner in which it is mounted on the wheel mount shown in Fig. 1 and which is of the type disclosed in U. S. Letters Patent No. 2,475,502, issued July 5, 1949, to Herbert G. Holmes.

Fig. 5 is a diagrammatic front elevation of a Wilson type apparatus showing an automobile supported thereon for measuring the alignment characteristics of the front wheels thereof.

Figs. 6 and 7 are diagrammatic views partly in plan, partly in elevation, illustrating respectively the initial and final steps in the operation of the apparatus shown in Fig. 1 in the measurement of caster.

Fig. 8 is a diagrammatic illustration partly in plan and partly in elevation of the apparatus shown in Fig. 1 as employed in measuring toe-out-on-turns or steering geometry.

Fig. 9 is a side elevational view of a modified form of the wheel-mirror assembly of my invention.

Fig. 10 is a face view of Fig. 9 taken in the direction of the arrow 10.

Fig. 11 is a top plan view of Fig. 10 taken on the line 11—11 of the latter.

Fig. 12 is a horizontal sectional view taken on the line 12—12 of Fig. 10 and looking upward so as to be approximately a bottom plan of said modification.

Fig. 13 is a fragmentary sectional view taken on the line 13—13 of Fig. 10 and illustrating the counterbalance of said modification.

Referring specifically to the drawings, Figs. 1 and 5 diagrammatically disclose a mirror and light beam dirigible wheel alignment characteristic measuring apparatus 10, which includes left and right optical units 11 and 11' which are slidable horizontally towards and away from each other on slides 12 and 12' provided on brackets 13 and 13' which project laterally from wheel supporting pedestals 14 and 14', the latter being fastened securely to the floor.

The pedestals 14 and 14' are provided with turn-tables 15 and 15' for supporting the dirigible front wheels 16 and 16' of an automobile 17, there being a suitable ramp (not shown) upon which this automobile may be driven to position the front wheels thereof on the turn-tables 15 and 15' as shown in Fig. 5.

A jack 18 is provided for lifting the front end of automobile 17 when it is desired to suspend wheels 16 and 16' for free rotation.

The optical units 11 and 11' are reverse duplicates of each other, and identical accessory equipment is associated with each so that a description of unit 11 and its associated equipment will suffice for both of these units. Subsequent references to parts of the unit 11' and its associated equipment will be made by use of the reference numerals applied to corresponding parts of unit 11 and its accessories, with prime attached.

Unit 11 includes a base 24 on which is mounted a short projector 25 having a lamp 26, condenser lenses 27, a vertically shiftable chart film slide 28 and a projection lens 29.

Also mounted on base 24 are mirrors 30 and 31 and a light beam projector 32 having a lamp 33, condenser lenses 34 and a cross-hair mask 35.

Associated with the unit 11 is a mirror mount 40, the detailed structure of which is fully disclosed in U. S. Letters Patent No. 2,475,502. This mount includes a pair of bars 41 fixed in a bracket 42 on which are formed jaws 43. Slideable on the bars 41 is a mirror support 44 and a clamp 45 on which is provided a jaw 46. Each of the jaws 43 and 46 has an inner face, these faces lying in a plane which is parallel with the plane of the bars 41, these jaws having teeth 47 in the form of hardened screws extending inwardly from said faces.

The clamp 45 has a cam 48 which is manually operable when the mirror mount 40 has been positioned as shown in Fig. 1 on the rim 49 of the wheel 16 to sink the teeth 47 into this rim and thereby secure the mount 40 in place on the rim with the inner faces of the jaws 43 and 46 snugly bearing against the peripheral outer flange of the rim 49.

The mount 44 has a stub shaft 50 carrying a double ball bearing 51 on which a wheel mirror assembly 52 is rotatably supported.

The mirror assembly 52 includes a frame 53 preferably of integral construction and which includes a middle mirror backing plate 54 from which a hollow hub 55 extends at right angles thereto, said hub receiving said bearing 51 and being held in assembled relation therewith by a disc 56 which is secured to the shaft 50 by a screw 57. Extending from one edge of the backing plate 54 is a wing mirror backing plate 58. The upper and lower edges of backing plates 54 and 58 are reinforced by flanges 59 having ears 60 at the ends thereof on the opposite side of the axis of the bearing 51 from the wing mirror backing plate 58. Extending between the ears 60 and having its opposite ends mounted therein is a small diameter shaft 61 on which a counterbalance weight 62 is slideably mounted.

The shaft 61 is disposed perpendicular to the planes of the flanges 59 and parallel with the planes of the backing plates 54 and 58.

Mounted on the front faces of the backing plates 54 and 58 respectively are a middle mirror 63 and a wing mirror 64.

The location of the shaft 61 on the wheel mirror assembly 52 and the size of the counterbalance weight 62 are such that whichever of two positions the wheel mirror assembly 52 is placed in, and which are disposed 180° apart, in which flanges 59 are disposed horizontally, which two positions are illustrated in Figs. 2 and 3, the counterbalance weight 62 slides along the shaft 61 so as to rest on the lowermost of the two ears 60 and, when so disposed, counterbalances the wheel mirror assembly 52 whereby this naturally assumes and maintains a horizontal position as shown in Fig. 2 or Fig. 3.

Also associated with the unit 11 is a screen 70 which is supported in vertical position and preferably in a plane perpendicular to the axis of the projector 25 and disposed symmetrically relative to the vertical plane containing said axis.

The chart film slide 28 is provided with a plurality of chart miniatures which may be selectively projected in enlarged form as a chart on the screen 70 by shifting the slide 28 vertically to vary the portion thereof exposed to the rays of light impinging upon said slide in the projector 25. When the slide 28 is in downward position as shown in Fig. 1, a miniature in the upper frame of this slide is projected on the screen 70 as a camber chart 71. Under similar circumstances in the unit 11', a similar chart 71' is projected on the screen 70'. These charts have horizontal and vertical zero lines which intersect at the axis of the chart projectors 25 and 25' and are provided with horizontal calibrations for the measurement of camber and vertical calibrations for the measurement of toe-in.

When the film slide 28 is in upward position, a miniature in the lower frame thereon is projected on the screen 70 as a caster chart 72. This chart has horizontal and vertical zero lines and horizontal calibrations for the measurement of caster, and vertical calibrations for the measurement of steering geometry. The vertical zero line on chart 72 carries the indicia "20" representing an inturned angle of 20° of the outside wheel on a turn as will be made clear in describing the operation of the invention.

*Operation*

This description of the operation is based on the assumption that the planes of the wheels 16 and 16' are perpendicular to their axes of rotation. Where this is not the case, corrections therefor may be made before starting to measure the alignment characteristics of these wheels with the apparatus 10, by the method and apparatus disclosed in the co-pending application of Myrton L. Vandermeer, Serial No. 38,616, filed July 14, 1948, or with the apparatus disclosed in my co-pending application, Serial No. 130,188, filed November 30, 1949.

When the unit 11 is energized so as to project the chart 71 on the screen 70, projector 32 projects a beam of light 73 (formed by the mask 35 into the shape of a cross-hair) onto the mirror 30 from which the beam is reflected onto the mirror 63 when the wheel 16 is turned approximately straight ahead (as in Fig. 1). This beam is thus reflected onto the mirror 31 and deflected thereby onto the screen 70 where it produces a cross-hair image 74.

The chart 71 is so calibrated that when the screen 70 is set up, as described, a predetermined distance from and parallel to a line 75 which passes through the centers of the wheels 16 and 16' (with the latter turned straight ahead), and when said unit 11 is spaced a specified distance from the mirror 63, the cross hair image 74 may be employed in the manner about to be described to utilize the horizontal calibrations on the chart 71 to measure the camber of the wheel 16 and to utilize the vertical calibrations on the chart 71 to measure the toe-in of the two wheels 16 and 16'.

The chart projector 25 is preferably disposed below and inwardly from the projector 32 and the projection axes of these projectors are preferably horizontal, which arrangement is disclosed in detail in the co-pending Carrigan application, Serial No. 659,317 above referred to as now Patent No. 2,601,262.

As previously noted, the wheel mirror assembly 52 is counterbalanced so that when placed in a horizontal position as shown in Fig. 1 it has to remain in that position, and if rotated 180° to its other horizontal position, it will tend to remain in that position likewise as long as undisturbed. It is immaterial which position the wheel mirror assemblies 52 and 52' are in for the measuring of camber and toe-in, which is accomplished as follows:

The wheels 16 and 16' are turned practically straight ahead as shown in Figs. 1 and 5 and with one of the cross-hair images 74 or 74' on the vertical zero line of its corresponding chart 71 or 71'. In Fig. 1, the apparatus is illustrated to show the wheels adjusted with the cross-hair image 74' on the vertical zero line of the chart 71'. This is all that it is necessary to do in order to read the camber of the two wheels on their respective charts by the distances C and C' that the cross-hair images 74—74' are spaced vertically above or below the horizontal zero lines of the charts 71—71'.

The toe-in or angle at which the two wheels 16 and 16' converge forwardly towards each other may be read by the horizontal distance T which the cross-hair image 74 is spaced from the vertical zero line on the chart 71.

The manner of utilizing the present invention in the measurement of caster is illustrated in Figs. 6 and 7 which diagrammatically show measuring the caster of the left wheel 16. To prepare for this, the wheel mirror assembly 52 is placed in the horizontal position in which it is shown in Figs. 1 and 6, and the film slide 28 is elevated to cause the projection of the caster chart 72 on the screen 70. The wheel 16 is now turned inwards until the wing mirror 64 receives and reflects the beam 73 to produce the cross-hair image 74 with this located on the vertical zero line marked 20—20 on the chart 72 as shown in Fig. 6. As the mirror 64 is angled 20° relative to the mirror 63, the wheel 16 will now be turned approximately 20° inwardly from straight ahead. The projection slide 28 is now manipulated to shift the chart 72 vertically until the horizontal zero line thereof passes through the center of the cross-hair image 74.

The wheel mirror assembly 52 is now rotated to its other horizontal position and the wheel 16 is turned outwardly until the wing mirror 64 receives and reflects the beam 73 to produce a cross-hair image 74 on the vertical zero line of the chart 72. The wheel 16 will now be turned outwardly at an angle of approximately 20°. Assuming that the wheel 16 has a positive caster which is the common practice in automobile construction, the cross-hair image 74 will now be located below the horizontal zero line of the chart 72 and the caster of the wheel 16 may be read in degrees on the horizontal calibrations provided on this chart.

The use of the present invention in measuring steering geometry is illustrated in Fig. 8. To prepare for this measurement, one of the wheel mirror assemblies 52 and 52' will be placed in one of its horizontal positions and the other will be placed in the opposite horizontal position. In Fig. 8 the wheel mirror assembly 52 is shown with its wing mirror 64 disposed forwardly and the wheel mirror assembly 52' is shown with its wing mirror 64' disposed rearwardly. The projection slides 28—28' are elevated to cause caster charts 72—72' to be projected on the screens 70—70'. The wheels 16 and 16' are now turned as shown in Fig. 8 to present the wing mirror 64' to the light beam 73' and bring the cross-hair image 74' onto the vertical zero line 20—20 of the chart 72'. This will be effected when the wheel 16' is turned inwardly approximately at an angle of 20°. The steering geometry angle of the wheel 16 will now be measured by the location of the cross-hair image 74 on the chart 72. Fig. 8 shows this cross-hair image resting on the vertical calibration indicating 23° as the out-turned angle of wheel 16.

Referring now to Figs. 9 to 13 inclusive, a modified form of the present invention is there illustrated which comprises a wheel mirror assembly 80 having a single plane mirror 81 which is adapted to be placed in any one of three positions, in one of which it performs the function of the mirror 63 of the wheel mirror assembly 52, and in the other two positions of which it performs the functions of the wing mirror 64 in its two positions disposed forwardly or rearwardly from the mirror 63.

The wheel mirror 80 includes a yoke member 82 which is formed integral with a hollow hub 83 which confines a double ball bearing (not shown) which rotatably relates the member 82 to the shaft 50 of the wheel mount slide 44 in the same manner as the frame 53 of the wheel mirror assembly 52 is similarly related as shown in Fig. 4.

Formed integral with the member 82 and extending forwardly from the upper and lower edges thereof respectively are a plate 84 and a boss 85. The mirror 81 is mounted on the front face of a plate 86 having upper and lower plates 87 and 88 formed integrally therewith and extending inwardly therefrom, the latter two plates being pivotally connected on a vertical axis by bolts 89 and 90 with the plate 84 and boss 85. The upper face of the plate 84 is provided with detent hollows 91 and a hole 92 in the plate 87 receives a ball 93 whereby it may be pressed into one of the three hollows 91 by a spring 94 to hold the mirror 81 in the full-line position in which it is shown in Fig. 11 or in either of the dotted-line positions 95 and 96 indicated in said figure for this mirror.

Formed at the juncture of the plates 86 and 88 is a thickened section 97 which extends the full length of the bottom edge of the plate 86. The plate 88 has a closed slot 98 just to the rear of the thickened section 97.

Secured to the lower face of the thickened section 97 by screws 99 extending through slots 100 therein are three counterbalance indexing plates 101, each of which has a lug 102 extending inwardly beneath the slot 98. Conforming to the thickened section 97 so as to rest on top of this and on top of the plate 88 is a counterbalance 108. Extending downwardly through the slot 98 from the counterbalance 108 is a handle 109 having a thickened portion 110 at its upper end, in the lower face of which is formed a notch 111, the latter being adapted to receive one of the lugs 102 in order to index the counterbalance 108 in one of three positions. Each of the indexing plates 101 is adjusted so that the lug 102 thereof is correctly positioned to index the counterbalance 108 to maintain the wheel mirror 80 in horizontal position when it is in one of its three positions as shown in Fig. 11.

The apparatus 10 is adapted to be operated with a pair of wheel mirror assemblies 80 substituted for the wheel mirror assemblies 52 and 52' in a similar manner as above described and to obtain identically the same results, the only difference being in the mode of adjusting the mirror 81 to cause it to present a suitable reflective mirror face to the light beams 73 and 73' during the different steps in the procedure.

Whenever one of the mirrors 81 is adjusted to its full-line position shown in Fig. 11, it is necessary to move the counterbalance 108 to its central position therein as shown in Figs. 10 and 12.

When this mirror is turned to one of its oblique positions 95 or 96, the counterbalance 108 is shifted into a position to be indexed by the lug 102 located at the outwardly projecting extremity of the wheel mirror assembly 80. In this manner, the wheel mirror assembly 80 is counterbalanced so that it finds and retains a substantially horizontal position about the axis of its mounting on the wheel mount 40 in each of its three positions.

The claims are:

1. In a wheel mirror assembly adapted to be supported on a mount attached to a dirigible wheel for measuring alignment characteristics of the latter, the combination of: a frame; means on said frame to rotatably relate said wheel mirror assembly to said mount on a substantially horizontal axis; a plane mirror fixed on said frame in perpendicular relation with said axis; a plane wing mirror fixed on said frame in angled relation with said first plane mirror; a counterbalance weight for said wheel mirror assembly; and means for shiftably mounting said weight on said frame to permit said weight to be shifted to a position below said axis on said wheel mirror assembly in either of two positions in each of which said wheel mirror assembly is rotated 180° about said axis from the other position.

2. In a wheel mirror assembly adapted to be supported on a mount attached to a dirigible wheel for measuring alignment characteristics of the latter, the combination of: a frame; means on said frame to rotatably relate said wheel mirror assembly to said mount on a substantially horizontal axis; a plane mirror fixed on said frame in perpendicular relation with said axis, said plane mirror being symmetrically disposed relative to said axis; a plane wing mirror fixed on said frame in angled relation with said first plane mirror; a counterbalance weight for said wheel mirror assembly; and means for shiftably mounting said weight on said frame to permit said weight to be shifted to a position below said axis on said wheel mirror assembly in either of two positions in each of which said wheel mirror assembly is rotated 180° about said axis from the other position.

3. In a wheel mirror assembly adapted to be supported on a mount attached to a dirigible wheel for measuring alignment characteristics of the latter, the combination of: a frame; means on said frame to rotatably relate said wheel mirror assembly to said mount on a substantially horizontal axis; a plane mirror fixed on said frame in perpendicular relation with said axis; a plane wing mirror fixed on said frame in angled relation with said first plane mirror; a shaft; brackets on said frame engaging opposite ends of said shaft for mounting said shaft on said frame with said shaft parallel with said first mirror, parallel with said second mirror, and symmetrically with respect to said axis, said shaft being also disposed vertically and on the opposite side of said axis from said wing mirror when said wheel mirror assembly is disposed horizontally; and a counterweight slidable on said shaft so as to shift to the lower end of the latter when said wheel mirror assembly is disposed in either of two horizontal positions disposed 180° apart about said axis, said shaft being so positioned and of such a length and said counterbalance being of such a weight that the latter counterbalances said wing mirror with said wheel mirror assembly in either of said two horizontal positions so as to cause the wheel mirror assembly to naturally assume one or the other of said horizontal positions and to remain in either when placed there.

JAMES P. CARR.

References Cited in the file of this patent

UNITED STATES PATENTS

| Number | Name | Date |
| --- | --- | --- |
| 1,525,114 | Yoscary | Feb. 3, 1925 |
| 1,562,936 | Ainsworth | Nov. 24, 1925 |
| 2,251,325 | Clark | Aug. 5, 1941 |
| 2,292,969 | Peters | Aug. 11, 1942 |
| 2,410,339 | Creagmile | Oct. 29, 1946 |
| 2,470,090 | Carrigan et al. | May 17, 1949 |
| 2,475,502 | Holmes | July 5, 1949 |
| 2,496,324 | Wilson | Feb. 7, 1950 |
| 2,601,262 | Carrigan | June 2, 1952 |